(12) United States Patent
Ross et al.

(10) Patent No.: US 6,908,110 B2
(45) Date of Patent: Jun. 21, 2005

(54) PROGRAMMABLE ENERGY ABSORBING SYSTEM

(75) Inventors: Christian E. Ross, Hemlock, MI (US); Xiaoyu Li, Saginaw, MI (US); Matthew W. Mielke, Saginaw, MI (US); James S. Baughman, Deford, MI (US)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 10/401,939

(22) Filed: Mar. 27, 2003

(65) Prior Publication Data

US 2003/0214127 A1 Nov. 20, 2003

Related U.S. Application Data

(60) Provisional application No. 60/368,331, filed on Mar. 28, 2002.

(51) Int. Cl.$^7$ .................................................. B62D 1/19
(52) U.S. Cl. ...................................................... 280/777
(58) Field of Search ................................. 280/775, 777, 280/779; 74/492, 493; 188/371, 374

(56) References Cited

U.S. PATENT DOCUMENTS

| | | | |
|---|---|---|---|
| 5,785,144 A | * | 7/1998 | Cakmaz et al. ............. 180/422 |
| 6,116,648 A | * | 9/2000 | Holly et al. ................. 280/777 |
| 6,176,151 B1 | | 1/2001 | Cymbal |
| 6,189,929 B1 | | 2/2001 | Struble et al. |
| 6,234,528 B1 | | 5/2001 | Ben-Rhouma et al. |
| 6,322,103 B1 | | 11/2001 | Li et al. |
| 6,367,840 B1 | | 4/2002 | Duval et al. |
| 6,375,220 B1 | | 4/2002 | Kamm |
| 6,450,532 B1 | | 9/2002 | Ryne et al. |
| 6,454,302 B1 | | 9/2002 | Li et al. |
| 6,478,333 B1 | | 11/2002 | Barton et al. |
| 6,575,497 B1 | | 6/2003 | McCarthy et al. |

* cited by examiner

Primary Examiner—David R. Dunn
(74) Attorney, Agent, or Firm—Michael D. Smith

(57) ABSTRACT

A collapsible steering column is used with motor vehicle. The motor vehicle has a frame. The steering column has an outer jacket and a stationery bracket. The outer jacket is releasably coupled to the frame. The stationery bracket is coupled to the frame. The outer jacket and stationery bracket are collapsible in response to release of the outer jacket from the frame. An electrically actuated brake mechanism is coupled between the stationery bracket and the outer jacket and provides an infinitely variable resistive force to the collapse of the outer jacket and the stationery bracket.

12 Claims, 2 Drawing Sheets

PROGRAMMABLE ENERGY ABSORBING SYSTEM

The present application claims priority to U.S. Provisional Patent Application 60/368,331 filed Mar. 28, 2002, which is hereby incorporated by reference.

FIELD OF THE INVENTION

This invention relates to occupant safety systems for automotive vehicles; more particularly, it relates to energy absorbing steering columns for protecting the vehicle driver in the event of a vehicle crash.

BACKGROUND OF THE INVENTION

Current design energy absorbing steering columns rely on the deformation of metal as the column collapses order to absorb energy. This technology has been used for over thirty years. It has many limitations. These limitations include: 1) The collapse rate is fixed. It cannot be varied to the load variations induced by the range of driver mass, velocity of the vehicle, or rate of deceleration, 2) The collapse rate cannot be varied during the course of a crash to exploit air bag/column collapse synergies, 3) No mechanism exists to provide feedback to the supplemental restraint system (airbag/column collapse mechanism) to tailor restraining forces to the maximum "G" forces deemed safe.

SUMMARY OF THE INVENTION AND ADVANTAGES

The system described herein overcomes all of the above-listed shortcomings of earlier systems and provides several other advantages. These are: 1) Column collapse is electronically controlled. For more severe crashes and/or heavier drivers, greater resistance to collapse is provided, 2) During the course of a crash, the rate of column collapse may be controlled to the various phases of the airbag deployment cycle, e.g. as the bag inflates it accelerates toward the driver whose torso is continuing to move toward the steering wheel at a high rate of speed. The force operating against the column is minimal at this point. As the bag is fully inflated, the driver's body is restrained by the bag. The bag in turn is acted upon by the resistive forces of the column. Total force can be measured by a load cell (or other device) in the column. The column collapse rate may be electrically varied to keep "G" forces felt by the driver within safe levels.

By actively controlling the column collapse rate, as well as actively controlling the vigor of the airbag deployment, a controlled, constant "G" force operating on the driver's body can be achieved. This even force is far more survivable than that produced by an airbag/column system that cannot be tuned to the severity of the crash or the size of the driver. In both systems the total energy absorbed by the driver's body may be equal, but the driver of the tuned system which kept "G" forces at a constant 20 G's will fare far better than the driver of a vehicle that produced an average of 5 G's, with a peak of 50 G's. The system described herein will produce the more favorable results of a steady "G" force as the driver "rides down" the kinetic energy of the crash on an even slope. This system is an active energy absorbing system.

The system comprises:

1. Steering column with a mechanical connection to an electromagnetorestrictive, or other Electro-brake device as exemplified by an electrically controlled torque brake. The purpose of this device is to variably control the amount of force required to collapse the column. It may be mechanically configured in several different ways. The attached drawing shows one configuration.

2. Means of controlling said "Electro-brake" device, e.g. microprocessor controlled crash sensor.

3. Means of storing actuation energy required by active braking (electrobraking) device. This is the storage capacitor in the attached schematic. This component could be either a capacitor or a storage cell (battery).

4. Means of controlling the amount of current delivered to the electromagnetic torque brake. The described system uses a PWM (Pulse Width Modulated) circuit that translates the signal from the crash computer (single point microprocessor) to a current signal applied to the magnetorestrictive device.

5. Force feedback may be provided, and used to modify the collapse rate of the column. The source of the force feedback is typically a loadcell. Column collapse position information may be collected from position sensors that produce a potentiometric output related to the linear displacement of the column. The rate of collapse may then be calculated and used as part of the feedback information to determine the optimal collapse resistance.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

With reference to the drawings and in operation, the present invention provides a system 10 and methods for controllably the collapse rate of a steering column 12 of a motor vehicle (not shown), such as an automobile. The steering column 12 collapse rate is controlled by a microprocessor based controller 14. As described below the collapse rate may be determined using one or more sensors 15.

Figure 1:
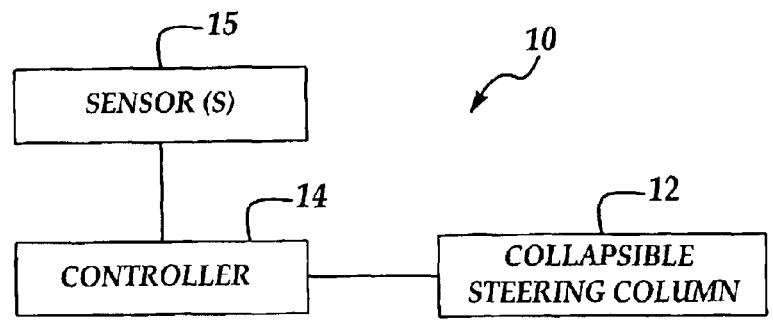
FIG. 1 is a block diagram of a system for controlling the collapse rate of a collapsible steering column, according to an embodiment of the present invention.
Figure 2:
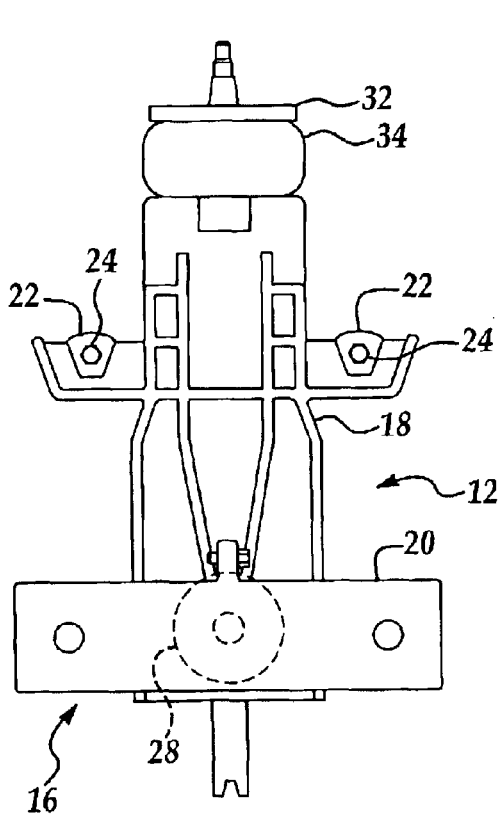
FIG. 2 is a plan view of the steering column assembly showing the components in their normal relative location and showing the electromagnetic brake shaft connected by a coiled wire to the stationary bracket.
Figure 3:
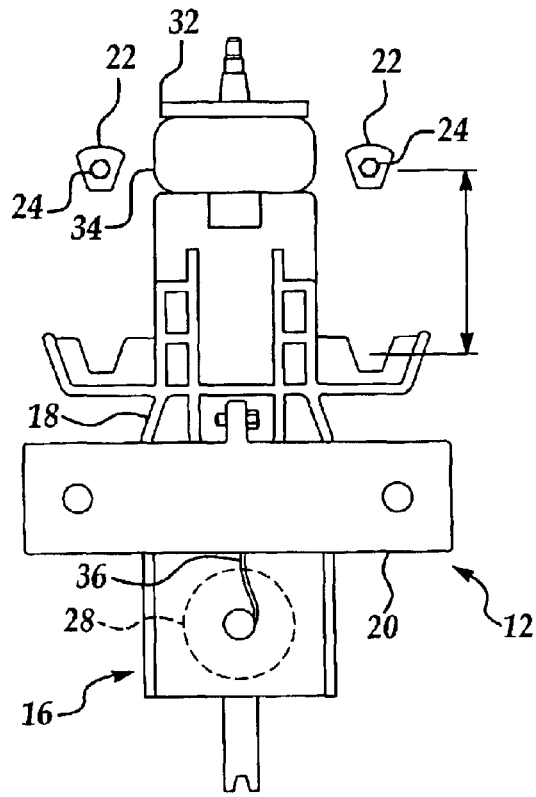
FIG. 3 is a plan view showing the relative position of the components which would result from a driver impact on the steering wheel in a vehicle crash which would cause collapse of the steering column.
Figure 4:
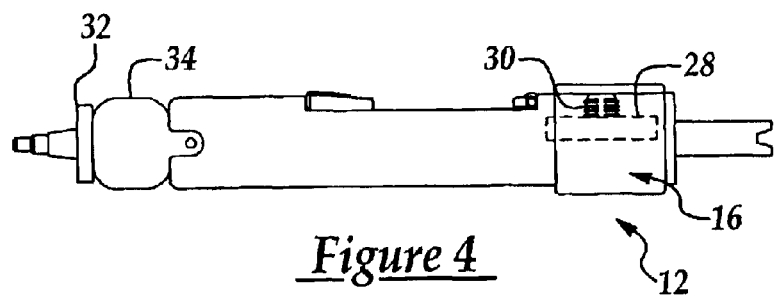
FIG. 4 shows a side elevation view of the steering column assembly shown in FIG. 2; and, FIG. 5 is a schematic diagram of the electronic control system for controlling the electromagnetic brake.

With reference to FIGS. 2–4, the steering column 12 includes an outer jacket 18 and a stationary bracket 20. The outer jacket 18 includes one or more capsules 22 which are bolted to a vehicle frame (not shown) by one or more bolts 24. The stationary bracket 20 is also bolted to the vehicle frame by bolts (not shown).

The outer jacket 18 is coupled to the stationary bracket 20 by an electrically actuated brake mechanism 16. When a force is exerted on the steering column 12, the capsules 22 may release, thereby decoupling the outer jacket 18 from the vehicle frame. Under such conditions, the force acts to compress the steering column 12, i.e., to reduce the distance between an upper end of the outer jacket 18 and the stationery bracket 20. As discussed below, the electrically actuated brake mechanism 16 allows the collapse rate to be controlled. In one embodiment, the electrically actuated brake mechanism 16 is infinitely variable In the illustrated embodiment, the electrically actuated brake 16 is an electrically actuated magnetic torque brake having a spool 28 located on one of the stationary bracket 20 and the outer jacket 18. A wire 30 is wound around the spool 26 and connected at one end to the other of the stationary bracket 20 and the outer jacket 18. In the illustrated embodiment, the spool 28 is located on the stationary bracket 20 and the one end of the wire 30 is connected to the outer jacket 18.

In operation, when actuated the brake 16 applies a force to the spool 28, thereby restricting its rotary motion. In this manner, the rate at which the wire 30 is "released", and thus the rate of collapse of the steering column 12, can be controlled. Although the electrically actuated brake 16 is illustrated and described as a torque brake, any type of infinitely variable brake may be used.

In one embodiment, the system 10 may be operated in an open loop manner. The sensors 15 may include one or more of the following: an airbag deployment sensor and sensors which give an indication of the size and weight of a passenger behind the steering column 12. For example, a weight sensor may determine the weight of the passenger. Other sensors may be used to determine the height of the passenger, such as by determining the relative positions of components of a seat in which the passenger is sitting. The controller 14 may be directly linked to some of these sensors 16 or may receive this information from other controllers (not shown) on the vehicle.

The vehicle may also include an airbag. The airbag may also be of the "staged" or programmable type.

In an open loop control mode, the controller 14 may first sense that a crash has occurred by, for example, detecting that the airbag has been deployed. The controller 14 may then control the rate of the collapse of the steering column 12 as a function of the other sensor signals. In one aspect of the present invention, the controller 14 determines a desired rate of collapse for a passenger having the known weight and/or size of the current passenger. In one embodiment, the controller 14 includes one or more computer look-up tables which are used to determine the desired rate of collapse as a function of the sensor signals.

When in the open loop mode, this system can respond to crash severity as determined by the crash sensor module (used for airbag deployment). The rate column collapse can be controlled electronically during the course of the crash as parameters such as crash severity, weight on the seat, and vehicle speed are factored in. The column collapse is dynamically controlled to operate in such a manner as to be complimentary to the airbag deployment.

When in feedback signal representing force acting on the steering column 12 may be incorporated (a closed loop system) but the system may also be operated as an open loop system operating with the vehicle's known crash characteristics. For example in the illustrated embodiment of FIG. 2, the steering column 12 includes a force sensor 32 located above a tilt head 34. The force sensor 32 measures the force exerted on the steering column 12.

The above described system greatly improves survivability of a crash over a non programmable energy absorbing column. Crash tuning is simplified (instead of altering structural components, collapse characteristics may be "dialed in").

The system 10 can be operated in closed loop control mode as well. All of the features described in open loop mode apply, and additional features may be designed in as well. These include: measurement of the amount of force being exerted by the driver as his/her body decelerates against the airbag/column system. This parameter may then be used to actively control the column collapse rate.

In one aspect of the present invention, column collapse force may be adjusted during the course of the crash to create the least physically damaging combination of airbag deployment, column stroke, and driver/passenger securement systems, e.g. active seatbelt locking mechanisms may be incorporated. For example, the controller 14 may control the electrically actuated brake 24 to control the collapse rate such that the force experienced by passenger is constant.

Figure 5:
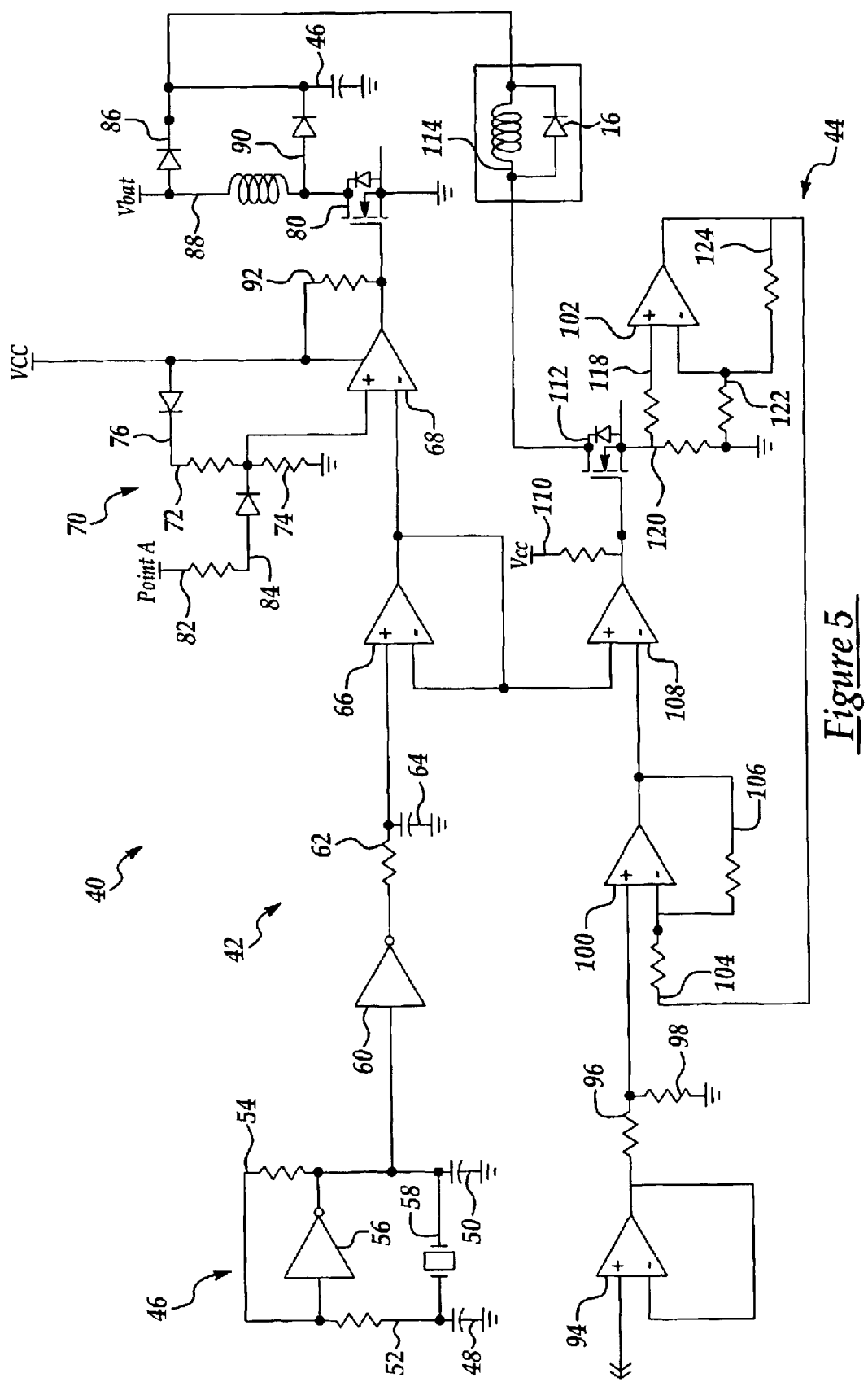

With reference to FIG. 5, the controller 14 includes an electronic circuit 40 coupled to the brake 16. In the illustrated embodiment, the electronic circuit 40 uses a pulse width modulated (PWM) signal to actuate the brake 16. The circuit 40 includes a charging circuit 42 and a discharging circuit 44. A schematic of the electrical portion of the system is attached.

The charging circuit 42 generates a high voltage using a PWM switchmode power supply and stores the energy required to control the column collapse rate in a capacitor 46 that powers the system 10 for the duration of the actuation period. The discharging circuit 44 supplies a controlled 0–6 amp PWM signal proportional to a 0–5 volt signal from the microprocessor.

The charging circuit 42 includes an oscillator 46 which includes first and second capacitors 48, 50, first and second resistors 52, 54, a buffer 56, and a crystal 58. In one embodiment, the crystal 58 has a frequency of 32,768 Khz. A second buffer 60 buffers the output signal of the oscillator 46. The output signal is integrated into a sawtooth waveform by a third resistor 62 and a third capacitor 64.

A first op amp 66 buffers the sawtooth signal which is used in both the charging circuit 42 and the discharging circuit 44.

The buffered sawtooth signal is input to the inverting input of a first comparator 68. The non-inverting input of the first comparator 68 is connected to a reference voltage derived from a voltage divider 70 which includes fourth and fifth resistors 72, 74. One end of the fourth resistor 72 is pulled up to the source voltage ($V_{CC}$) through a first diode 76. This will give the highest duty cycle, to quickly charge the charging capacitor 46. As the capacitor voltage is built up, the voltage at "Point A" increases, which causes the duty cycle output of the first comparator 68 to decrease, lowering the power dissipation of a first switching transistor 80. Point A is coupled to the voltage divider 70 via a sixth resistor 82 and a second diode 84. A third diode 86 charges the charging capacitor 78 to ignition voltage at turn on, reducing the total time to charge the cap.

A first inductor 88 forms part of a tuned circuit which stores energy allowing the impedance transform. A fourth diode 90 charges the charging capacitor 46 to the peak voltage across the first inductor 88. A seventh resistor 92 couples the output of the first comparator 68 to the supply voltage.

The discharging circuit 44 receives a signal from the microprocessor indicative of a desired actuation level of the electrically actuated brake 16. In the illustrated embodiment, the received signal is between 0 and 5 volts. The output of the circuit is a current which is used to actuate the brake 16. In the illustrated embodiment, the current has a value between 0 and 6 amps.

A second op amp 94 and eighth and ninth resistors, 96,98 buffer the input signal. A third op amp 100 subtracts the "current" signal from the "requested current" signal (the input). If the actual current matches the requested current, there is no output. The request current signal is the output of the second op amp 94. The current signal is the output of a fourth op amp 102 which is coupled to the inverting input of the third op amp 100 by a tenth resistor 104.

If the "requested current" is larger than "actual current" the resultant DC signal will cause third op amp 100 to increase its output.

The output of the third op amp 100 is coupled to its inverting input by a eleventh resistor 106. The output of the third op amp 102 is coupled to the inverting input of a second comparator 108. The non-inverting input of the second comparator 108 is coupled to the first op amp 66 and receives the sawtooth waveform. The comparison of the sawtooth waveform and the signal from the third op amp 100 controls the width of the pulse output of the second comparator 108. The output of the second comparator 108 is coupled to supply voltage by a twelfth resistor 110 and to a second switching transistor 112. The second switching transistor 112 controls the discharge of current from the charging capacitor 46 through the brake 16 which is modeled by a coil 114 and a fifth diode 116.

The fourth op amp 94 is coupled to the second switching transistor 112 by thirteenth, fourteenth, and fifteenth resistors 118, 120, 122. The output of the fourth op amp 94 is coupled to its inverting input by a sixteenth resistor 124. The fourth op amplifies the current to voltage signal supplied by the fourteenth resistor 120 and turns it into a 0–5 volt signal representative of load current.

The inductance of the coil integrates the output of second switching transistor 112 into a smooth DC signal whose current through the load matches the current requested by the controller 14.

Obviously, many modifications and variations of the present invention are possible in light of the above teachings. The invention may be practiced otherwise than as specifically described within the scope of the appended claims.

What is claimed is:

1. A collapsible steering column for use with motor vehicle, the motor vehicle having a frame, comprising:
   an outer jacket being releasable coupled to the frame;
   a stationary bracket coupled to the frame, the outer jacket being collapsible relative to the stationary bracket in response to release of the outer jacket from the frame; and,
   an electrically actuated brake mechanism coupled between the stationary bracket and the outer jacket for providing a infinitely variable resistive force to the collapse of the outer jacket and the stationary bracket.

2. A collapsible steering column, as set forth in claim 1, further comprising at least one capsule coupled between the outer jacket and the frame for releasing the outer jacket from the frame in response to a force being exerted on the steering column.

3. A collapsible steering column, as set forth in claim 1, wherein the electrically actuated brake mechanism is a torque brake.

4. A collapsible steering column, as set forth in claim 1, wherein the electrically actuated brake mechanism includes a spool and wire wound on the spool.

5. A collapsible steering column, as set forth in claim 4, wherein one end of the wire is connected to one of the outer jacket and the stationary bracket and the spool is connected to the other of the outer jacket and the stationary bracket.

6. A system for use with a motor vehicle having a frame, comprising:
   a collapsible steering having an outer jacket releasably coupled to the frame, a stationary bracket coupled to the frame, the outer jacket being collapsible relative to the stationary bracket in response to release of the outer jacket from the frame;
   an electrically actuated brake mechanism coupled between the stationary bracket and the outer jacket for providing a infinitely variable resistive force to the collapse of the outer jacket and the stationary bracket; and,
   a controller coupled to the electrically actuated brake mechanism for controllably actuating the electrically actuated brake mechanism to deliver a controlled rate of collapse.

7. A system, as set forth in claim 6, further comprising at least one capsule coupled between the outer jacket and the frame for releasing the outer jacket from the frame in response to a force being exerted on the steering column.

8. A system, as set forth in claim 6, wherein the electrically actuated brake mechanism is a torque brake.

9. A system, as set forth in claim 6, wherein the electrically actuated brake mechanism includes a spool and wire wound on the spool.

10. A system, as set forth in claim 9, wherein one end of the wire is connected to one of the outer jacket and the stationary bracket and the spool is connected to the other of the outer jacket and the stationary bracket.

11. A system, as set forth in claim 6, further comprising at least one sensor for sensing at least one of the following deployment of an airbag, weight of a passenger in a seat, and height of a passenger in the seat.

12. A system, as set forth in claim 6, wherein the controlled rate of collapse is determined as a function of signals received from the at least one sensor.

* * * * *